G. W. HAMMOND.
CULTIVATOR.
APPLICATION FILED OCT. 30, 1919.

1,334,855.

Patented Mar. 23, 1920.

WITNESSES

INVENTOR
George M. Hammond.
BY
Munn & Co
ATTORNEYS

UNITED STATES PATENT OFFICE.

GEORGE WASHINGTON HAMMOND, OF MOROCCO, INDIANA.

CULTIVATOR.

1,334,855.  Specification of Letters Patent.  Patented Mar. 23, 1920.

Application filed October 30, 1919. Serial No. 334,518.

*To all whom it may concern:*

Be it known that I, GEORGE WASHINGTON HAMMOND, a citizen of the United States, and a resident of Morocco, county of Newton, State of Indiana, have invented a new and useful Cultivator, of which the following is a full, clear, and exact description.

The present invention relates to a cultivator and has particular reference to that class of such cultivators which are usually drawn by sulkies and the like.

The primary object of the invention is to provide a so-called sulky cultivator which is capable of simultaneously cultivating the soil between a number of rows of vegetation.

A further object is to so construct the cultivator that the blades thereof may be vertically and horizontally adjusted relative to the soil over which they are drawn.

With these and other objects in view the invention will be further described in reference to the accompanying drawing in which—

Figure 1:
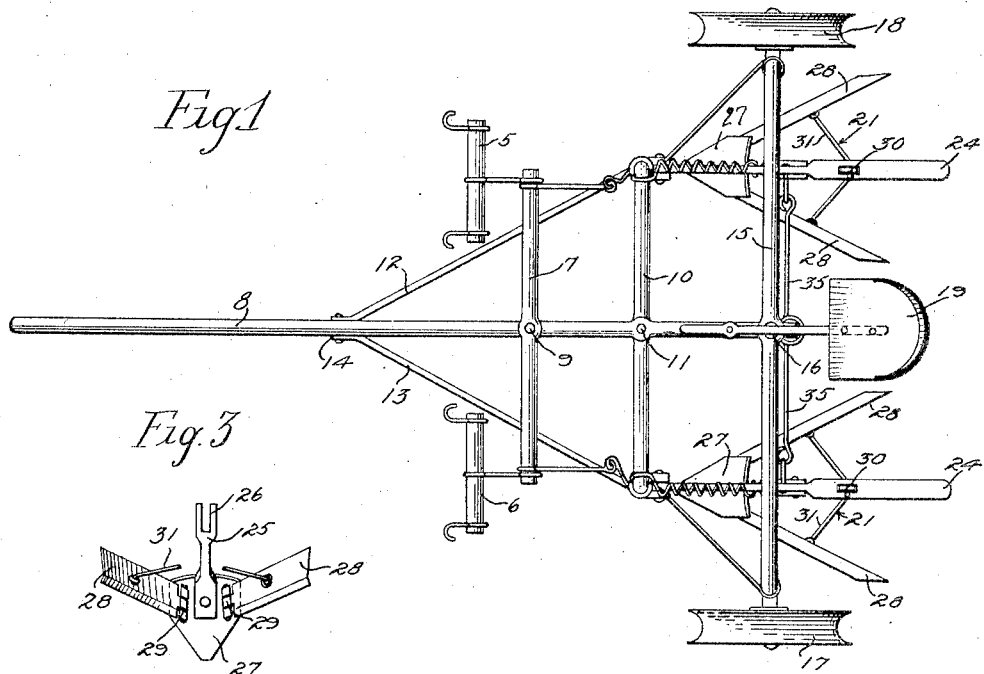
Figure 1 is a plane view of a preferred embodiment of the invention.
Figure 3:
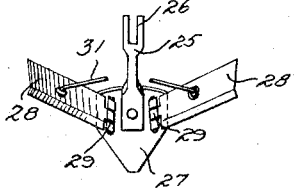
Fig. 3 is an enlarged view of one of the cultivators *per se*.
Figure 2:
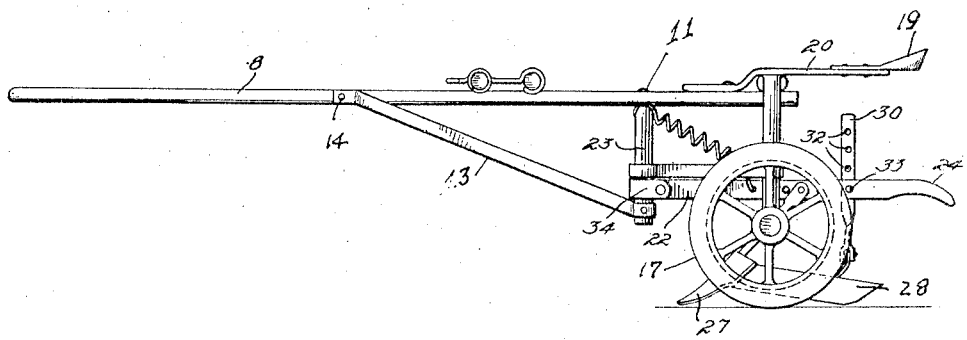
Fig. 2 is a side elevation.

Referring now to the drawings by reference characters, the sulky preferably embodies a frame so constructed as to enable the same to be drawn by two or more horses with the whiffletrees 5 and 6 connected for this purpose mounted to a draft bar 7 which is transversely disposed on the sulky frame and fixed to the pole 8 as at 9. A second bar 10 is mounted on the frame and fixed to the pole as at 11 with the braces 12 and 13 extending from this bar at an angle to the frame and secured to opposite sides of the pole 8 as at 14. The pole 8 extends longitudinally through the frame with the axle 15 fixed thereto as at 16, the axle being bent downwardly with the sulky wheels 17 and 18 fixed to horizontal portions thereof in a plane lower than that of the horizontal portion of the upwardly bent part. 19 represents a seat which may be occupied by the driver the same being supported on the frame by the longitudinally presented member 20. The track of the sulky is such as to provide a relatively wide frame so that the same may be capable of suspending a plurality of cultivators such as 21.

According to the preferred form these cultivators are two in number each of which have draft bars 22 which are secured to the downwardly presented ends 23 of the bar 10. These draft bars extend rearwardly of the sulky with handles 24 provided at their ends. Vertical blade supporting beams 25 are mounted to the draft bars 22 by a yoke connection 26. Supported on the end of these beams are the hoe blades 27 with the scraper blades 28 hinged as at 29, and diverging rearwardly of the hoe blades. Presented vertically of these scraper blades are the adjusting means comprising the uprights 30 which are mounted to the scraper blades by the links 31. These uprights extend through openings in the draft bars 22 and are provided with openings as at 32 with corresponding openings in the side of the draft bars made to receive pins 33 which extend through the openings 32 in the uprights 30 in order that the vertical position of the scraper blades, as well as the hoe blades, may be adjusted. The draft bars 22 are connected to the downwardly presented ends 23 of the bar 10 by straps 34 so that they may be swung in a horizontal plane. Inasmuch as the cultivators are connected together by the links 35 and by means of the strap connections 34 their horizontal position may be adjusted by means of the handles 24. The yoke connection 26 together with the uprights with their connection to the draft bar 22 will permit the vertical adjustment of the blades.

It will be readily seen that the sulky may be drawn with the draft animals between two adjacent rows of vegetation, the cultivators 21 being presented on opposite sides of the two rows and with the wheels 17 and 18 of the sulky traversing between the next two rows. In other words, the cultivators may be employed to cultivate four rows at the same time, which has heretofore been impossible with present known types of instruments.

Suitable tension devices such as the coiled springs may be employed to connect the cultivators through the draft bars with the bar 10 of the sulky frame.

Having thus described my invention what I claim as new and desire to secure by Letters Patent is as follows:—

1. In a cultivator, the combination of a sulky having a relatively wide track, of a plurality of multiple row cultivators on the sulky, each of which being capable of acting upon the soil between two adjacent rows at the same time and means for vertically and horizontally adjusting the cultivators relative to the soil over which the sulky is drawn, each of said cultivators comprising a pivoted draft bar with a blade supporting beam mounted thereon, a hoe blade on the beam and a pair of diverging scraper blades extending rearwardly of the hoe blade.

2. In a cultivator, the combination of a sulky having a relatively wide track, of a plurality of multiple row cultivators on the sulky, each of which being capable of acting upon the soil between two adjacent rows at the same time and means for vertically and horizontally adjusting the cultivators relative to the soil over which the sulky is drawn, each of said cultivators comprising a pivoted draft bar with a blade supporting beam mounted thereon, a hoe blade on the beam and a pair of diverging scraper blades extending rearwardly of the hoe blade, and said adjusting means comprising an opening in the draft bar of each cultivator, a standard connected to the scraper blades of each cultivator and extending through said opening and means for maintaining said standard in different vertical positions in said opening.

GEORGE WASHINGTON HAMMOND.